(12) United States Patent
Kozuma et al.

(10) Patent No.: US 11,378,397 B2
(45) Date of Patent: Jul. 5, 2022

(54) GEOID MEASUREMENT METHOD, GEOID MEASUREMENT APPARATUS, GEOID ESTIMATION DEVICE, AND GEOID CALCULATION DATA COLLECTION DEVICE

(71) Applicants: JAPAN AVIATION ELECTRONICS INDUSTRY, LIMITED, Tokyo (JP); TOKYO INSTITUTE OF TECHNOLOGY, Tokyo (JP)

(72) Inventors: Mikio Kozuma, Kanagawa (JP); Ryotaro Inoue, Tokyo (JP); Toshiyuki Hosoya, Tokyo (JP); Atsushi Tanaka, Tokyo (JP)

(73) Assignees: JAPAN AVIATION ELECTRONICS INDUSTRY, LIMITED, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 17/057,862

(22) PCT Filed: Jun. 4, 2019

(86) PCT No.: PCT/JP2019/022094
§ 371 (c)(1),
(2) Date: Nov. 23, 2020

(87) PCT Pub. No.: WO2020/021867
PCT Pub. Date: Jan. 30, 2020

(65) Prior Publication Data
US 2021/0199435 A1 Jul. 1, 2021

(30) Foreign Application Priority Data

Jul. 24, 2018 (JP) .............................. JP2018-138406

(51) Int. Cl.
*G01C 13/00* (2006.01)
*G01C 19/58* (2006.01)
(Continued)

(52) U.S. Cl.
CPC .............. *G01C 13/00* (2013.01); *G01C 19/58* (2013.01); *G01C 23/00* (2013.01); *G01S 19/14* (2013.01)

(58) Field of Classification Search
CPC ........ G01C 13/00; G01C 19/58; G01C 23/00; G01S 19/14
(Continued)

(56) References Cited

U.S. PATENT DOCUMENTS 7,376,507 B1 * 5/2008 Daily ..................... G01C 21/00
340/988
8,994,952 B2 3/2015 Iizuka et al.
(Continued)

FOREIGN PATENT DOCUMENTS

CN 103674030 A 3/2014
CN 104061945 A 9/2014
(Continued)

OTHER PUBLICATIONS

Yamada et al., "Technology and Application Products about GPS Hybrid Navigation for Inertial Navigation System", JAE Technical Report, No. 33, dated Mar. 3, 2010, pp. 1-10, and partial English language translation thereof.
(Continued)

*Primary Examiner* — Aditya S Bhat
(74) *Attorney, Agent, or Firm* — Greenblum & Bernstein, P.L.C.

(57) ABSTRACT

A change in geoid height is measured easily. A geoid measurement method of the present invention executes an inertial measurement data acquiring step, a comparison data
(Continued)

acquiring step, a state variable estimating step, and a geoid calculating step. In the inertial measurement data acquiring step, data related to velocity, position, and attitude angle is acquired as inertially-derived data based on the output of an inertial measurement part having a three-axis gyro and a three-axis accelerometer attached to a moving body. In the comparison data acquiring step, data related to velocity is acquired as comparison data from a source other than the inertial measurement part. In the state variable estimating step, state variables including a plumb line deviation are estimated by using the inertially-derived data and the comparison data to apply a Kalman filter in which the plumb line deviation is included in the state variables.

13 Claims, 10 Drawing Sheets

(51) Int. Cl.
    *G01C 23/00*     (2006.01)
    *G01S 19/14*     (2010.01)

(58) Field of Classification Search
    USPC .............................................................. 702/2
    See application file for complete search history.

(56) References Cited

U.S. PATENT DOCUMENTS

| | | |
|---|---|---|
| 2020/0256677 A1 | 8/2020 | Kozuma et al. |
| 2020/0300630 A1 | 9/2020 | Kozuma et al. |
| 2020/0318968 A1 | 10/2020 | Kozuma et al. |
| 2020/0333139 A1 | 10/2020 | Kozuma et al. |

FOREIGN PATENT DOCUMENTS

| | | |
|---|---|---|
| CN | 104061945 A | 9/2014 |
| JP | S63-302317 A | 12/1988 |
| JP | 2006-138697 A | 6/2006 |
| JP | 2013-205083 A | 10/2013 |
| JP | 2015-203618 A | 11/2015 |

OTHER PUBLICATIONS

Yahagi, "Possible Uses of Optical Lattice Clock in Geodetic Field", Science and Technology Council Advanced Research Infrastucture Subcommittee, Quantum Science and Technology Committee (3rd), dated May 10, 2016, pp. 1-14, and partial English language translation thereof.
International Search Report issued in International Patent Application No. PCT/JP2019/022094 dated Jul. 16, 2019, and English language translation thereof.
U.S. Appl. No. 16/720,584 to Hiroshi Arita, filed Dec. 19, 2019.
First Office Action in corresponding CN Application No. 201980039389.1, dated Feb. 9, 2022, along with an English translation thereof.
Examination Report No. 2 in corresponding AU Application No. 2019311445, dated Feb. 25, 2022.
Jekeli et al., "Geoid profile determination by direct integration of GPS inertial navigation system vector gravimetry", Journal of Geophysical Research, vol. 107, No. B10, pp. ETG3-1, dated Oct. 1, 2002.
Kwon, "Airborne vector gravimetry using GPS/INS", pp. 1-142, Geodetic Science and Surveying, Department of Civil and Environmental Engineering and Geodetic Science, The Ohio State University, dated Apr. 1, 2000.
Extended European Search Report issued in European Patent Office (EPO) Patent Application No. 19841833.7, dated Jul. 13, 2021.
AU Examination Report No. 1 dated Oct. 4, 2021 in related AU application 2019311445.
Office Action in Corresponding EP Application No. 19841833.7, dated Mar. 30, 2022.

\* cited by examiner

GEOID MEASUREMENT METHOD, GEOID MEASUREMENT APPARATUS, GEOID ESTIMATION DEVICE, AND GEOID CALCULATION DATA COLLECTION DEVICE

TECHNICAL FIELD

The present invention relates to a geoid measurement method, a geoid measurement apparatus, a geoid estimation device, and a geoid calculation data collection device for calculating a change in geoid height or a geoid height by using an inertial measurement part having a three-axis gyro and a three-axis accelerometer.

BACKGROUND ART

Figure 1:
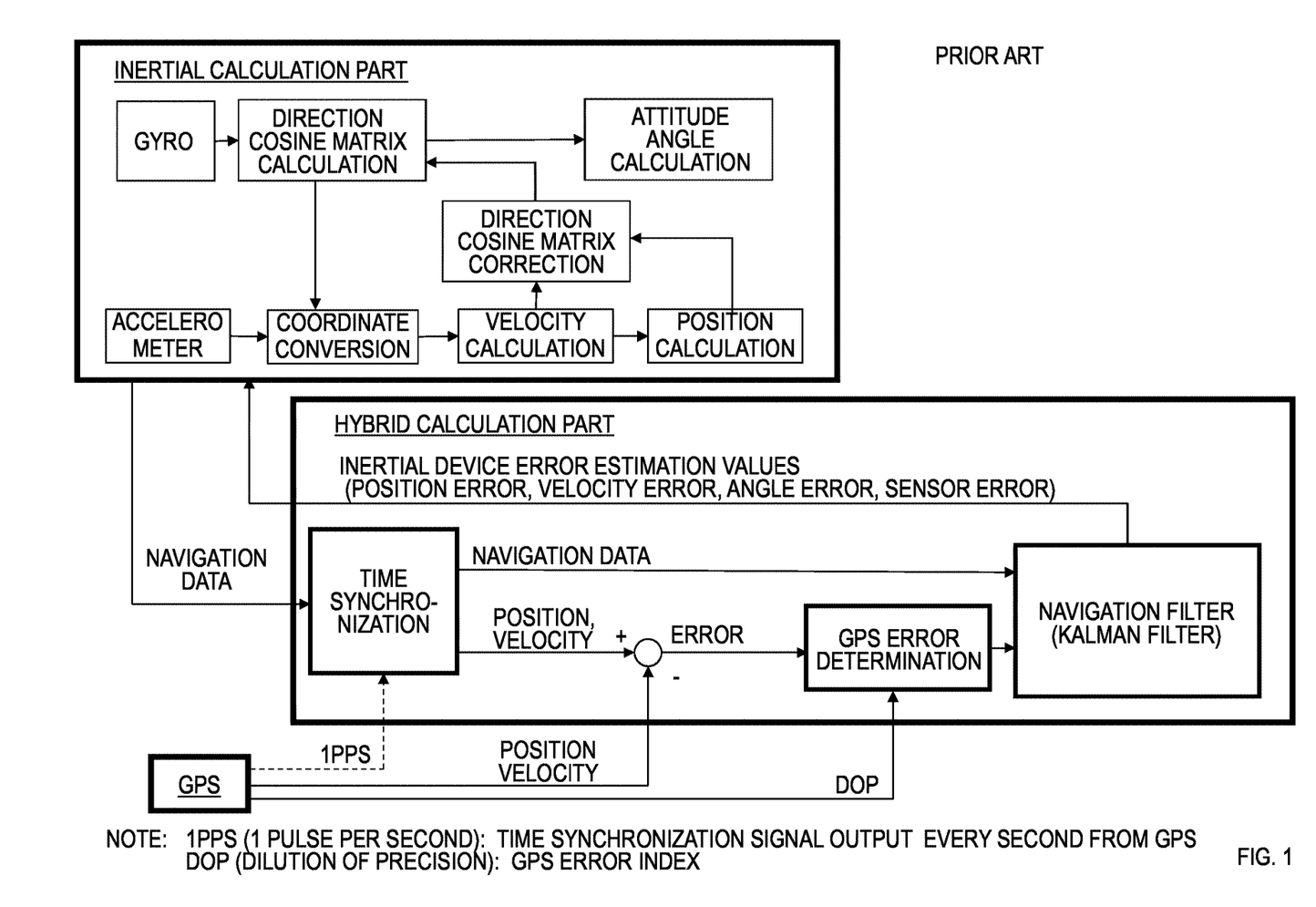
FIG. 1 is a diagram illustrating the "GPS hybrid navigation block diagram (loose cup method)" illustrated in FIG. 4 of Non-patent literature 1.

The technologies illustrated in literature such as Patent literature 1 and Non-patent literature 1 are known as technologies that correct data related to a position, a velocity, and an attitude angle calculated from the outputs of a three-axis gyro and a three-axis accelerometer based on data obtained from another sensor or the like. The data obtained from another sensor or the like is Global Positioning System (GPS) data in many cases, but may also be combined with data other than GPS, as illustrated in Non-patent literature 1. FIG. 1 is a diagram illustrating the "GPS hybrid navigation block diagram (loose cup method)" illustrated in FIG. 4 of Non-patent literature 1.

Non-patent literature 2 is literature describing possibilities in the geodetic field, providing an explanation of and issues related to elevation, ellipsoidal height, and geoid height, and also illustrating possibilities when using an optical lattice clock. In Non-patent literature 2, elevation is described as "the height from mean sea level (geoid) to ground level, determined by leveling". Ellipsoidal height is described as "the height from an Earth ellipsoid to ground level, determined by GNSS survey". Geoid height is described as "the height from an Earth ellipsoid to mean sea level, a potential surface such as gravitational potential, with unevenness reflecting the heterogeneity of Earth's internal mass distribution".

PRIOR ART LITERATURE

Patent Literature

Patent literature 1: Japanese Patent Application Laid-Open No. S63-302317

Non-Patent Literature

Non-patent literature 1: Masaki Yamada, Ryutaro Takeuchi, and Takayuki Okuyama, "Technology and Application Products about GPS Hybrid Navigation for Inertial Navigation System", JAE Technical Report, No. 33, pp. 1-10, March 2010, [retrieved Jun. 12, 2018], Internet <https://www.jae.com/jp/gihou/gihou33/pdf/g_05.pdf Non-patent literature 2: Toshihiro Yahagi, "Possible Uses of Optical Lattice Clock in Geodetic Field", Science and Technology Council Advanced Research Infrastructure Subcommittee, Quantum Science and Technology Committee (3rd), pp. 1-14, May 10, 2016, [retrieved Jun. 12, 2018], Internet <http://www.mext.go.jp/b_menu/shingi/gijyutu/gijyutu17/010/shiryo/_icsFil es/afieldfile/2016/06/23/1372759_6.pdf>

SUMMARY OF THE INVENTION

Problems to be Solved by the Invention

Non-patent literature 2 indicates that determining elevation by leveling is time-consuming and costly. Furthermore, the possibility of using an optical lattice clock to determine the elevation at a benchmark is indicated.

As described above, geoid height is an important target of measurement. However, there is no method of measuring geoid height easily. Accordingly, an object of the present invention is to provide a geoid measurement method, a geoid measurement apparatus, a geoid estimation device, and a geoid calculation data collection device for measuring a change in geoid height easily.

Means to Solve the Problems

A geoid measurement method of the present invention executes an inertial measurement data acquiring step, a comparison data acquiring step, a state variable estimating step, and a geoid calculating step. In the inertial measurement data acquiring step, data related to velocity, position, and attitude angle is acquired as inertially-derived data based on the output of an inertial measurement part having a three-axis gyro and a three-axis accelerometer attached to a moving body. In the comparison data acquiring step, data related to velocity is acquired as comparison data from a source other than the inertial measurement part. In the state variable estimating step, state variables including a plumb line deviation are estimated by using the inertially-derived data and the comparison data to apply a Kalman filter in which the plumb line deviation is included in the state variables. In the geoid calculating step, a change in geoid height is calculated based on the estimated plumb line deviation at an estimated position that the estimating applied to.

A geoid measurement apparatus of the present invention comprises an inertial measurement data acquisition part, a comparison data acquisition part, a state variable estimation part, and a geoid calculation part. The inertial measurement data acquisition part is provided with an inertial measurement part having a three-axis gyro and a three-axis accelerometer attached to a moving body, and acquires data related to velocity, position, and attitude angle as inertially-derived data. The comparison data acquisition part acquires data related to velocity as comparison data from a source other than the inertial measurement part. The state variable estimation part estimates state variables including a plumb line deviation by using the inertially-derived data and the comparison data to apply a Kalman filter in which the plumb line deviation is included in the state variables. The geoid calculation part calculates a change in geoid height based on the estimated plumb line deviation at the estimated position that the estimating applied to.

A geoid estimation device of the present invention comprises a recording part, a state variable estimation part, and a geoid calculation part. The recording part records inertially-derived data and comparison data in association with each other, the inertially-derived data being data related to velocity, position, and attitude angle acquired based on an output of an inertial measurement part having a three-axis gyro and a three-axis accelerometer attached to a moving body, and the comparison data being data related to velocity acquired from a source other than the inertial measurement part. The state variable estimation part estimates state variables including a plumb line deviation by using the inertially-derived data and the comparison data to apply a Kalman filter in which the plumb line deviation is included in the state variables. The geoid calculation part calculates a change in geoid height based on the estimated plumb line deviation at the estimated position that the estimating applied to.

A geoid calculation data collection device of the present invention comprises an inertial measurement data acquisition part, a comparison data acquisition part, and a recording part. The inertial measurement data acquisition part acquires data related to velocity, position, and attitude angle as inertially-derived data based on the output of an inertial measurement part having a three-axis gyro and a three-axis accelerometer attached to a moving body. The comparison data acquisition part acquires data related to velocity as comparison data from a source other than the inertial measurement part. The recording part records the inertially-derived data and the comparison data in association with each other. Also, the inertial measurement part is characterized by having a bias stability that allows error arising from plumb line deviation to be distinguished to a predetermined degree.

Effects of the Invention

According to the geoid measurement method, geoid measurement apparatus, and geoid estimation device of the present invention, a change in geoid height can be calculated. According to the geoid calculation data collection device, data necessary for calculating a change in geoid height can be collected.

DETAILED DESCRIPTION OF THE EMBODIMENTS

Hereinafter, embodiments of the present invention will be described in detail. Note that structural elements having the same function are denoted with the same signs, and duplicate description of such elements is omitted.

Example 1

<Apparatus Configuration and Process Flows>

Figure 2:
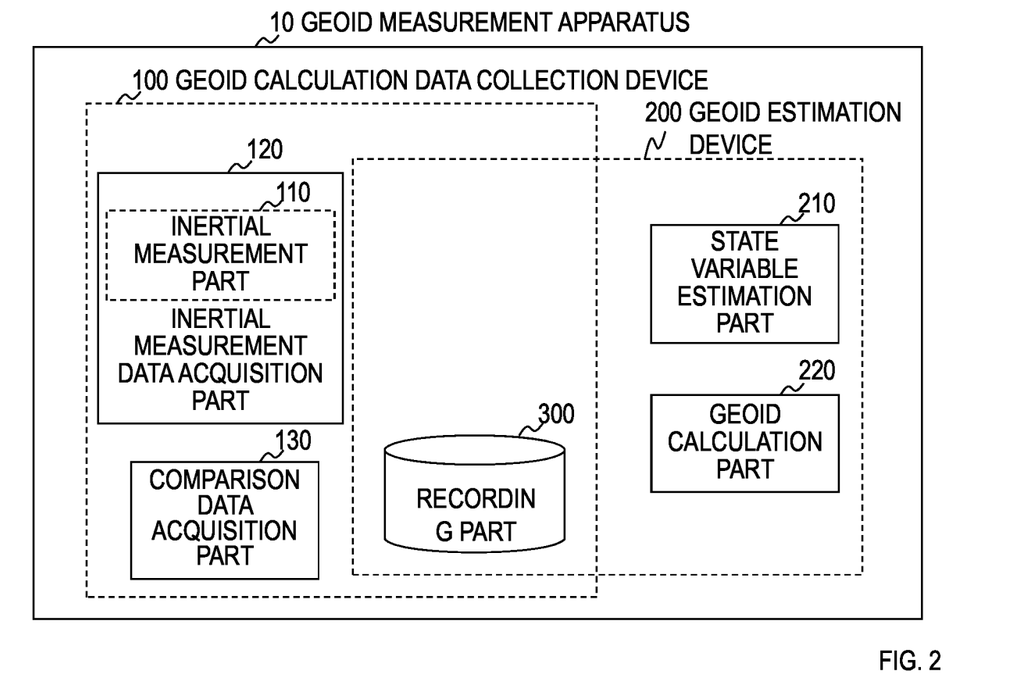
FIG. 2 is a diagram illustrating a functional configuration example of a geoid measurement apparatus, a geoid calculation data collection device, and a geoid estimation device.
Figure 3:
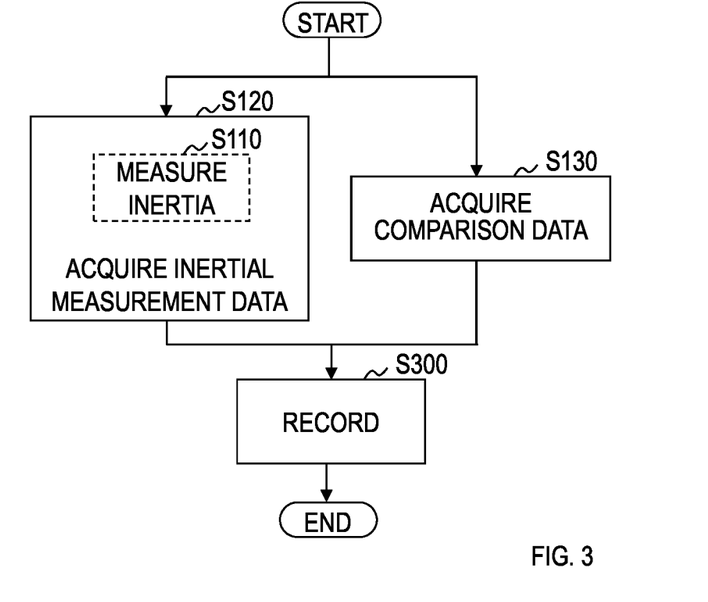
FIG. 3 is a diagram illustrating an example of a process flow of the geoid calculation data collection device.
Figure 4:
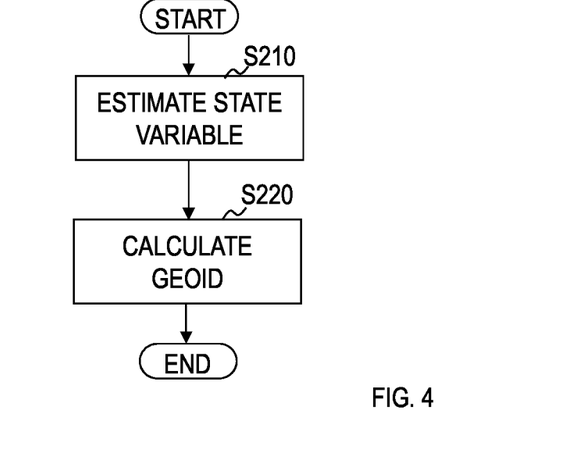
FIG. 4 is a diagram illustrating an example of a process flow of the geoid estimation device.
Figure 5:
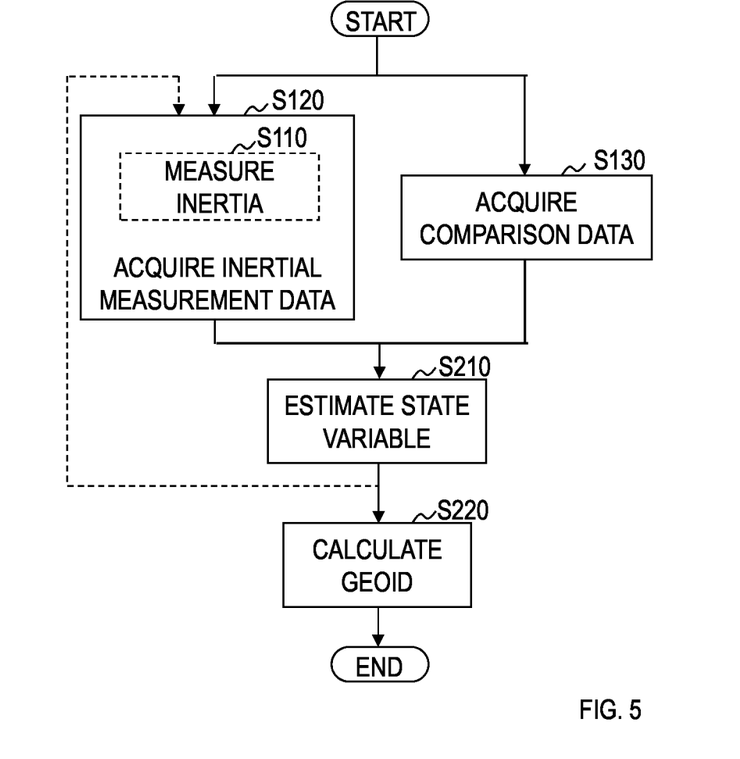
FIG. 5 is a diagram illustrating an example of a process flow of the geoid measurement apparatus.

FIG. 2 illustrates a functional configuration example of a geoid measurement apparatus, a geoid calculation data collection device, and a geoid estimation device. FIG. 3 illustrates an example of a process flow of the geoid calculation data collection device, FIG. 4 illustrates an example of a process flow of the geoid estimation device, and FIG. 5 illustrates an example of the process flow of the geoid measurement apparatus. A geoid calculation data collection device 100 comprises an inertial measurement data acquisition part 120, a comparison data acquisition part 130, and a recording part 300. A geoid estimation device 200 comprises the recording part 300, a state variable estimation part 210, and a geoid calculation part 220. A geoid measurement apparatus 10 is a configuration comprising both the geoid calculation data collection device 100 and the geoid estimation device 200, and comprises the inertial measurement data acquisition part 120, the comparison data acquisition part 130, the state variable estimation part 210, the geoid calculation part 220, and the recording part 300. In addition, the geoid calculation data collection device 100 and the geoid estimation device 200 may also be separate. Note that it is sufficient to realize the geoid measurement apparatus 10, the geoid calculation data collection device 100, and the geoid estimation device 200 by causing a processing circuit such as a computer to execute an installed program.

The inertial measurement data acquisition part 120 may include an inertial measurement part 110, or the inertial measurement part 110 may be external to the inertial measurement data acquisition part 120 and transfer data only. The inertial measurement part 110 is attached to a moving body and has a three-axis gyro and a three-axis accelerometer. The moving body is an automobile, a train, a ship, an aircraft, or the like. The inertial measurement part 110 may be provided with an internal function of converting the outputs from the three-axis gyro and the three-axis accelerometer into a velocity, a position, and an attitude angle, or the conversion function may be provided external to the inertial measurement part 110 and internal to the inertial measurement data acquisition part 120. The inertial measurement data acquisition part 120 acquires data related to velocity, position, and attitude angle as inertially-derived data based on the output of the inertial measurement part having the three-axis gyro and the three-axis accelerometer attached to the moving body (S110, S120). "Data related to velocity" refers to not only velocity data, but also position data and acceleration data. "Data related to position" may refer to a position relative to a predetermined fixed point, a position relative to the previously measured point (a point that changes every time), or an absolute position such as latitude, longitude, and altitude. In this way, such "data related to velocity, position, and attitude angle" may be the velocity, position, and attitude angle themselves, but is not limited thereto insofar as the data can be used to uniquely calculate the velocity, position, and attitude angle.

The inertial measurement part 110 is characterized by having a bias stability that allows error arising from plumb line deviation to be distinguished to a predetermined degree. The term "plumb line deviation" refers to the difference between the direction of an actual plumb line on Earth (the direction of a still string on which a weight is suspended) and the normal direction of an Earth ellipsoid. For example, there is a plumb line deviation in the north-south direction and a plumb line deviation in the east-west direction. In the case of a gyro typically being used in aircraft at the time of the present application, the error due to the bias stability is large, and therefore the error arising from the plumb line deviation is ignored. For example, even with the inertial device hybrid technology illustrated in Non-patent literature 1, the plumb line deviation in the north-south direction and the plumb line deviation in the east-west direction are not considered. Furthermore, gravity anomalies are not considered. A "gravity anomaly" is the difference between the actual value of gravity and standard gravity. However, although still in the research stage, if a practical implementation of a gyro using atomic waves or ions is achieved, the precision will be improved by at least an order of magnitude. In addition, even with a ring laser gyro (RLG) already in practical use, if the diameter is increased by tenfold, the precision could be theoretically improved by a hundredfold. Moreover, the diameter of a ring laser gyro can be increased by tenfold and still be installed onboard an automobile or a train. Also, if data repeatedly measured N times on the same path is used, a precision of $N^{1/2}$ can be achieved. Consequently, it is possible to set the bias stability such that error arising from the plumb line deviation in the north-south direction and the plumb line deviation in the east-west direction can be distinguished to a predetermined degree. Note that "to a predetermined degree" means deciding the precision of a calculated geoid height, and it is sufficient to decide the predetermined degree according to the demanded precision.

The comparison data acquisition part 130 acquires data related to velocity from a source other than the inertial measurement part 110 as comparison data (S130). For example, the comparison data acquisition part 130 may acquire satellite positioning data such as GPS data, or acquire data from a source other than the inertial measurement part 110, such as from a speedometer. "Data related to velocity" refers to not only velocity data itself, but also data from which the velocity can be uniquely calculated, such as position data and acceleration data. For example, in the case where the comparison data acquisition part 130 captures radio waves transmitted from an artificial satellite, the comparison data is latitude, longitude, and ellipsoidal height data. Latitude, longitude, and ellipsoidal height data is position data, but if the change over time is calculated, the data can be uniquely converted to velocity data. Consequently, latitude, longitude, and ellipsoidal height data is also included in "data related to velocity".

In the case of the geoid calculation data collection device 100, the recording part 300 records the inertially-derived data and the comparison data in association with each other (S300). In the case of the geoid measurement apparatus 10, the inertially-derived data and the comparison data may be recorded to the recording part 300 once or input into the state variable estimation part 210 in association with each other. In the case where data is recorded to the recording part 300, the recording part 300 records the inertially-derived data, namely the data related to velocity, position, and attitude angle acquired based on the output of the inertial measurement part 110 having the three-axis gyro and the three-axis accelerometer attached to the moving body, and the comparison data, namely the data related to velocity acquired from a source other than the inertial measurement part 110, in an associated state. Note that the recording part 300 itself of the geoid calculation data collection device 100 may be moved and incorporated into the geoid estimation device 200, or the data recorded to the recording part 300 of the geoid calculation data collection device 100 may be transmitted to the recording part 300 of the geoid estimation device 200 over a network.

The state variable estimation part 210 uses the inertially-derived data and the comparison data to apply a Kalman filter in which a plumb line deviation is included in state variables, and thereby estimates the state variables including the plumb line deviation (S210). In the Kalman filter, at least the plumb line deviation, velocity, position, and attitude angle are included in the state variables. As the plumb line deviation, it is sufficient for the plumb line deviation in the north-south direction and the plumb line deviation in the east-west direction to be included in the state variables. Consequently, the error in the inertially-derived data and the plumb line deviation can be estimated. Note that in the Kalman filter, a gravity anomaly component may also be included in the state variables. In the case of the geoid measurement apparatus 10, the error in the inertially-derived data calculated based on the estimated state variables may also be supplied to the inertial measurement data acquisition part 120 or the inertial measurement part 110 as feedback. By supplying feedback in this way, hybrid technology like that of Patent literature 1 or Non-patent literature 1 can be used. Consequently, because the data related to velocity, position, and attitude angle acquired by the inertial measurement data acquisition part 120 can be corrected using the estimated state variables, a change in geoid height can be measured while also correcting the state.

The geoid calculation part 220 calculates a change in geoid height based on the estimated plumb line deviation at the estimated position that the estimating applied to (S220). It is sufficient to estimate the plumb line deviation in the north-south direction and the plumb line deviation in the east-west direction as the "plumb line deviation". Note that the recording part 300 may also record information about the geoid height with respect to a predetermined reference position, such as the geoid height of a benchmark. In this case, it is sufficient for the geoid calculation part 220 to calculate the geoid height at each of the estimated positions based on the information about the geoid height at the predetermined reference position. For example, if the moving body moves along a path that includes one benchmark, one geoid height on the path is known. For other points on the path, it is sufficient to calculate the geoid height at each point from the difference with respect to the point with the known geoid height. Particularly, in the case where an automobile or a train is used as the moving body and the position information from a source other than the inertial measurement part 110 is obtained by GPS, latitude, longitude, and ellipsoidal height can be acquired as the comparison data. In addition, because the geoid height is also understood, the elevation with respect to the latitude and longitude can also be calculated.

According to the geoid calculation data collection device 100, because the inertial measurement part 110 has a bias stability that allows error arising from the plumb line deviation in the north-south direction and the plumb line deviation in the east-west direction to be distinguished to a predetermined degree, the data needed to calculate a change in geoid height can be collected. According to the geoid measurement method, the geoid measurement apparatus 10, and the geoid estimation device 200 of the present invention, by using inertially-derived data and comparison data to apply a Kalman filter in which the plumb line deviation is included in the state variables, the state variables including the plumb line deviation are estimated, and therefore a change in geoid height can be calculated. Note that even if the geoid height is unknown, if the change in geoid height is understood, the geoid measurement method, the geoid measurement apparatus 10, the geoid estimation device 200, and the geoid calculation data collection device 100 of the present invention can be used for purposes such as searching for resources.

<Theoretical Explanation and Simulation>

The velocity equation in aviation coordinate systems is given by $$\dot{v}_{eb}{}^n = C_b{}^n f^b - (2\omega_{ie}{}^n + \omega_{en}{}^n) \times v_{eb}{}^n + g^n \quad \text{[Formula 1]}$$

The subscripts n, e, and b denote the navigation coordinate system, the Earth fixed system, and the body coordinate system, respectively. Expressing the components gives $$\frac{d}{dt}\begin{bmatrix} v_N \\ v_E \\ v_D \end{bmatrix} = C_b^n \begin{bmatrix} f_{ibx}^b \\ f_{iby}^b \\ f_{ibz}^b \end{bmatrix} - \left(2\begin{bmatrix} \Omega\cos\lambda \\ 0 \\ -\Omega\sin\lambda \end{bmatrix} + \begin{bmatrix} \frac{v_E}{R_0+h} \\ -\frac{v_N}{R_0+h} \\ -\frac{v_E\tan\lambda}{R_0+h} \end{bmatrix}\right) \times \begin{bmatrix} v_N \\ v_E \\ v_D \end{bmatrix} + g^n \quad \text{[Formula 2]}$$

Here, $v_N$, $v_E$, and $v_D$ correspond to the northward velocity, the eastward velocity, and the downward velocity, respectively. $C_b^n$ is the direction cosine matrix that determines the attitude of the body coordinate system with respect to the navigation coordinate system. The terms $f_{ibx}^b$, $f_{iby}^b$, and $f_{ibz}^b$ express the forces measured by three accelerometers. The terms $\lambda$ and h denote the latitude and altitude of the aircraft, while $R_0$ and $\Omega$ express the radius and the rotational angular velocity of Earth. If the cross products in the formula are calculated and the plumb line deviations in the north-south direction and east-west direction are denoted as $\xi$ and $\eta$, the following formula is obtained. In this formula, gravitational changes in the vertical direction (variations from g) are ignored.

$$\frac{d}{dt}\begin{bmatrix} v_N \\ v_E \\ v_D \end{bmatrix} = C_b^n \begin{bmatrix} f_{ibx}^b \\ f_{iby}^b \\ f_{ibz}^b \end{bmatrix} + \begin{bmatrix} -2\Omega v_E \sin\lambda + \frac{v_N v_D - v_E^2 \tan\lambda}{R_0+h} + \xi g \\ 2\Omega(v_N \sin\lambda + v_D \cos\lambda) + \frac{v_E}{R_0+h}(v_D + v_N \tan\lambda) - \eta g \\ -2\Omega v_E \cos\lambda - \frac{v_E^2 + v_N^2}{R_0+h} + g \end{bmatrix} \quad \text{[Formula 3]}$$

Also, if a gravity anomaly is expressed as $\delta$, the following formula is obtained.

$$\frac{d}{dt}\begin{bmatrix} v_N \\ v_E \\ v_D \end{bmatrix} = C_b^n \begin{bmatrix} f_{ibx}^b \\ f_{iby}^b \\ f_{ibz}^b \end{bmatrix} + \begin{bmatrix} -2\Omega v_E \sin\lambda + \frac{v_N v_D - v_E^2 \tan\lambda}{R_0+h} + \xi(g+\delta) \\ 2\Omega(v_N \sin\lambda + v_D \cos\lambda) + \frac{v_E}{R_0+h}(v_D + v_N \tan\lambda) - \eta(g+\delta) \\ -2\Omega v_E \cos\lambda - \frac{v_E^2 + v_N^2}{R_0+h} + g + \delta \end{bmatrix} \quad \text{[Formula 4]}$$

Note that a gravity anomaly is a state variable not used to calculate a change in geoid height, but in the case where the precision of the inertial measurement part is improved, including the gravity anomaly in the state variables is thought to enable accurate computation of the plumb line deviation.

Similar differential equations also exist for the attitude angle and the position besides the velocity above, but the differential equation related to velocity is the one that affects the plumb line deviation. In the present invention, by performing a Kalman filter in which at least two plumb line deviation components are included in the state variables of the system, it is possible to estimate the state variables including the plumb line deviation. Also, if the gravity anomaly is also considered, there is also a possibility of being able to estimate the plumb line deviation more accurately.

Figure 6:
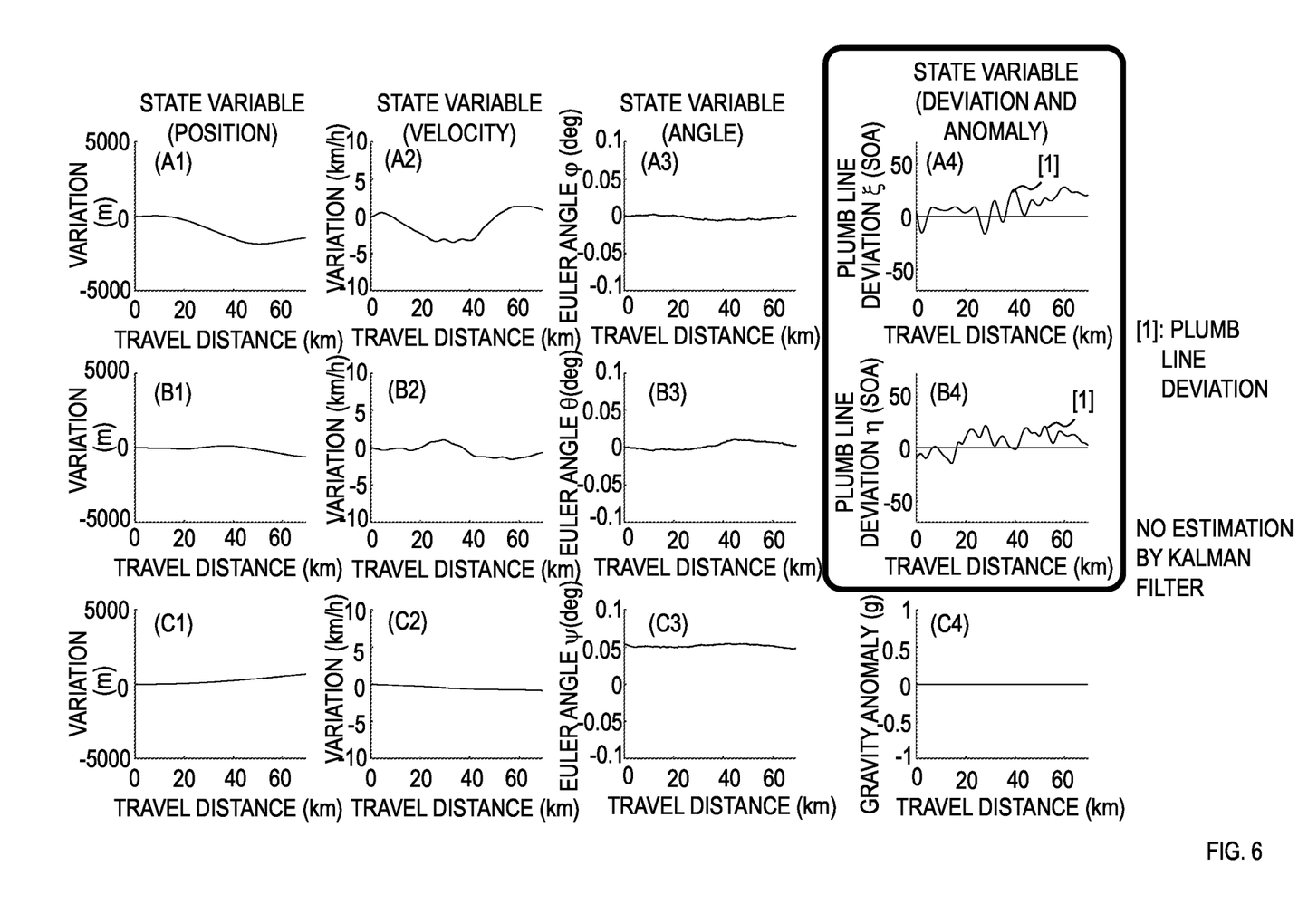
FIG. 6 is a diagram illustrating a case where an inertial measurement part equipped with a ring laser gyro having a level of precision comparable to existing technology is installed onboard a vehicle, in which position, velocity, and angle data are acquired but comparison data is not acquired.
Figure 7:
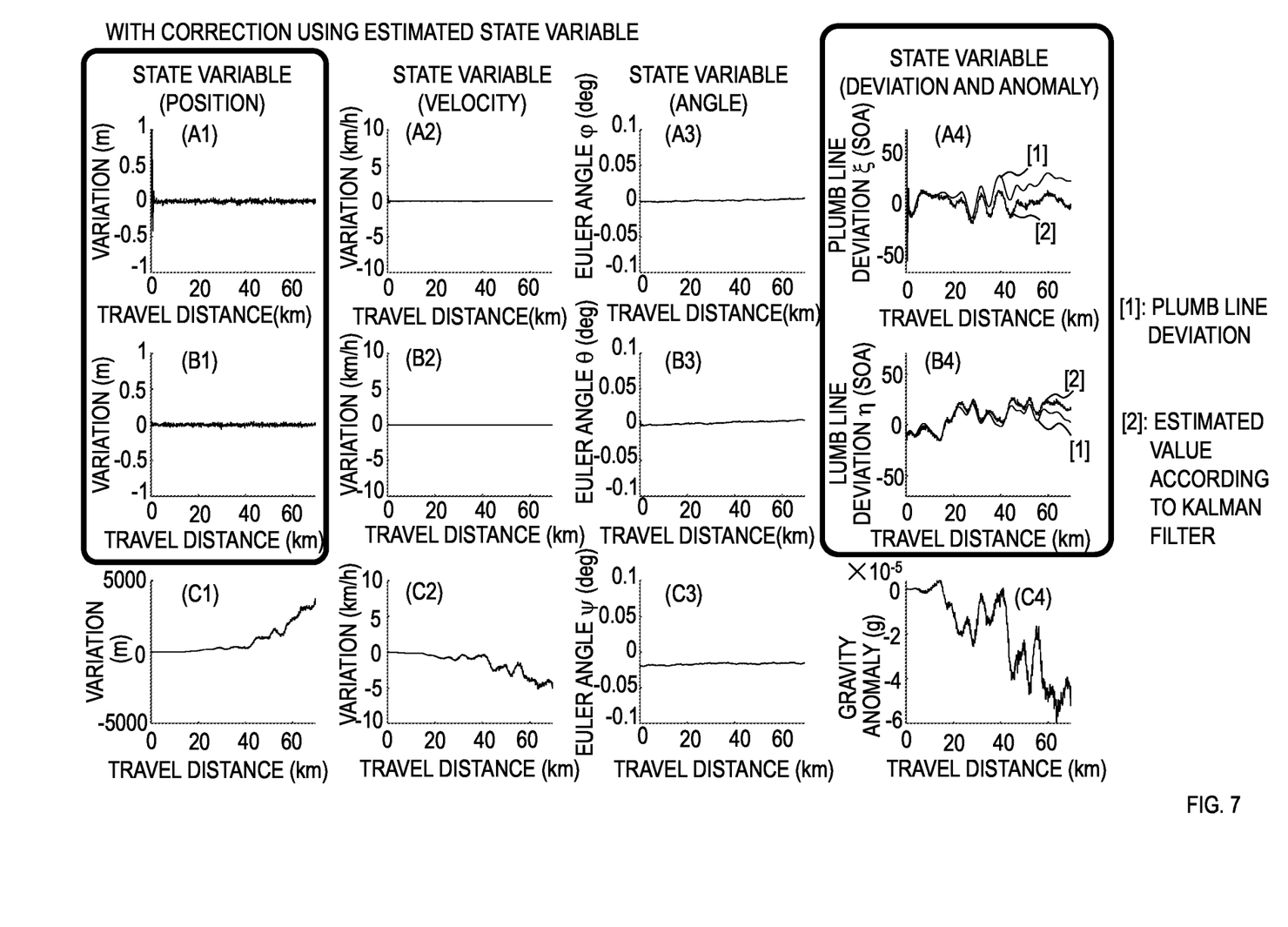
FIG. 7 is a diagram illustrating an example in which an inertial measurement part equipped with a ring laser gyro having a level of precision comparable to existing technology is installed onboard a vehicle, satellite positioning data is used as comparison data, the same configuration as the geoid measurement apparatus of the present invention is used, and state variables including a plumb line deviation and a gravity anomaly are estimated by applying a Kalman filter in which the plumb line deviation and the gravity anomaly are included in the state variables to data obtained from a single run.
Figure 8:
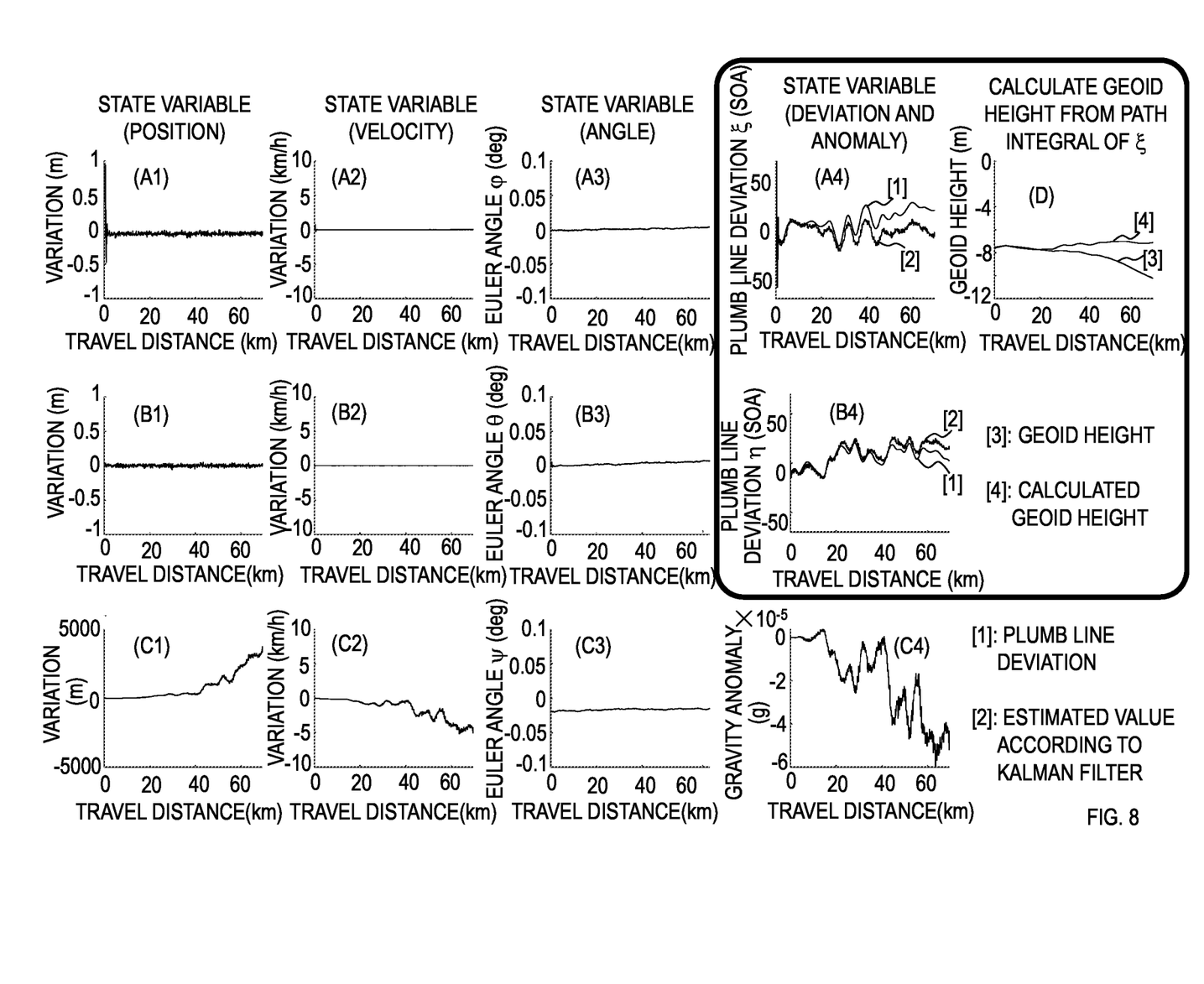
FIG. 8 is a diagram illustrating an example of measuring geoid height based on the estimated plumb line deviation in the example illustrated in FIG. 7.
Figure 9:
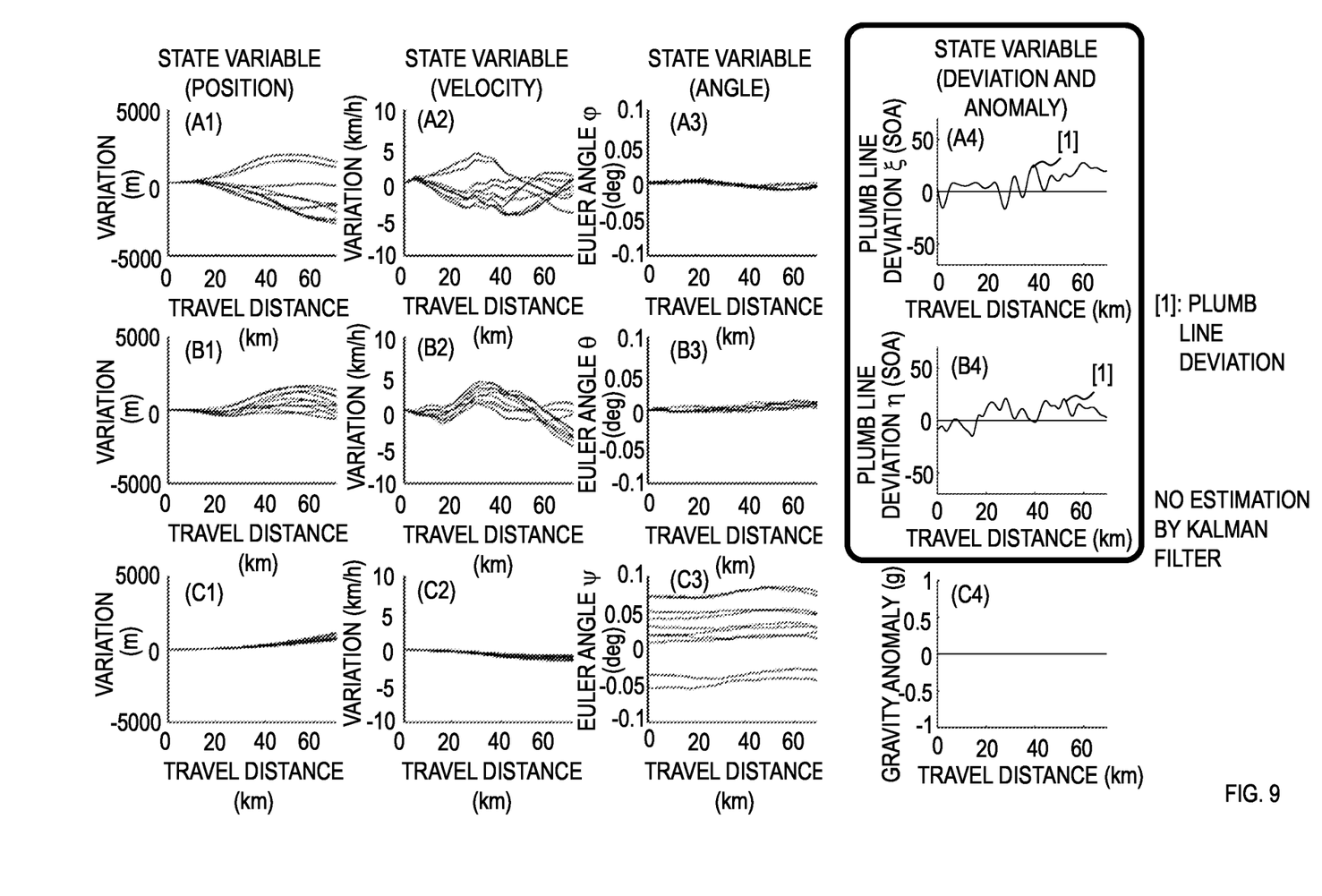
FIG. 9 is a diagram illustrating data obtained from 10 runs with the same configuration as FIG. 6.
Figure 10:
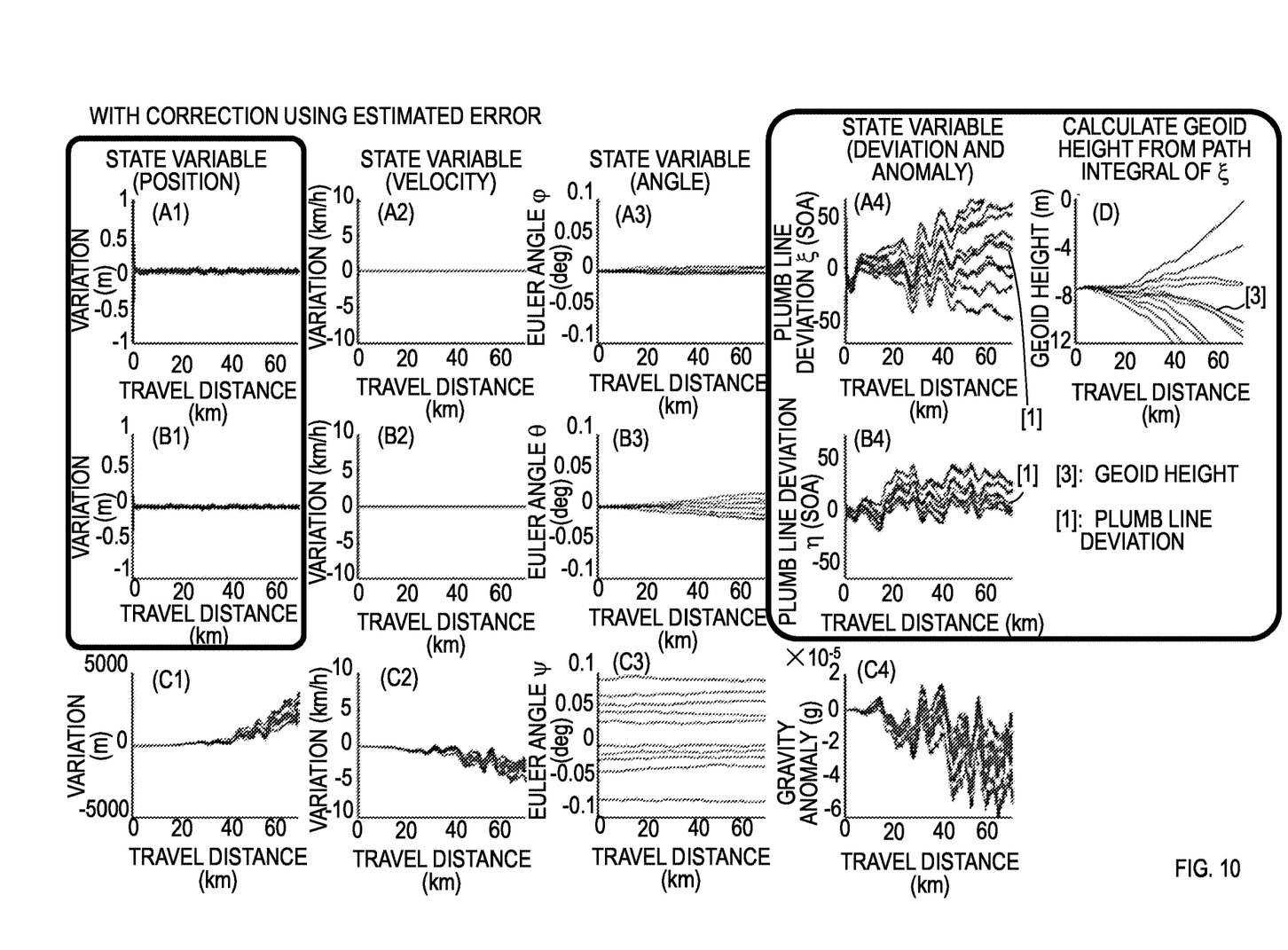
FIG. 10 is a diagram illustrating an example of measuring geoid height with data obtained from 10 runs with the same configuration as FIG. 8.
Figure 11:
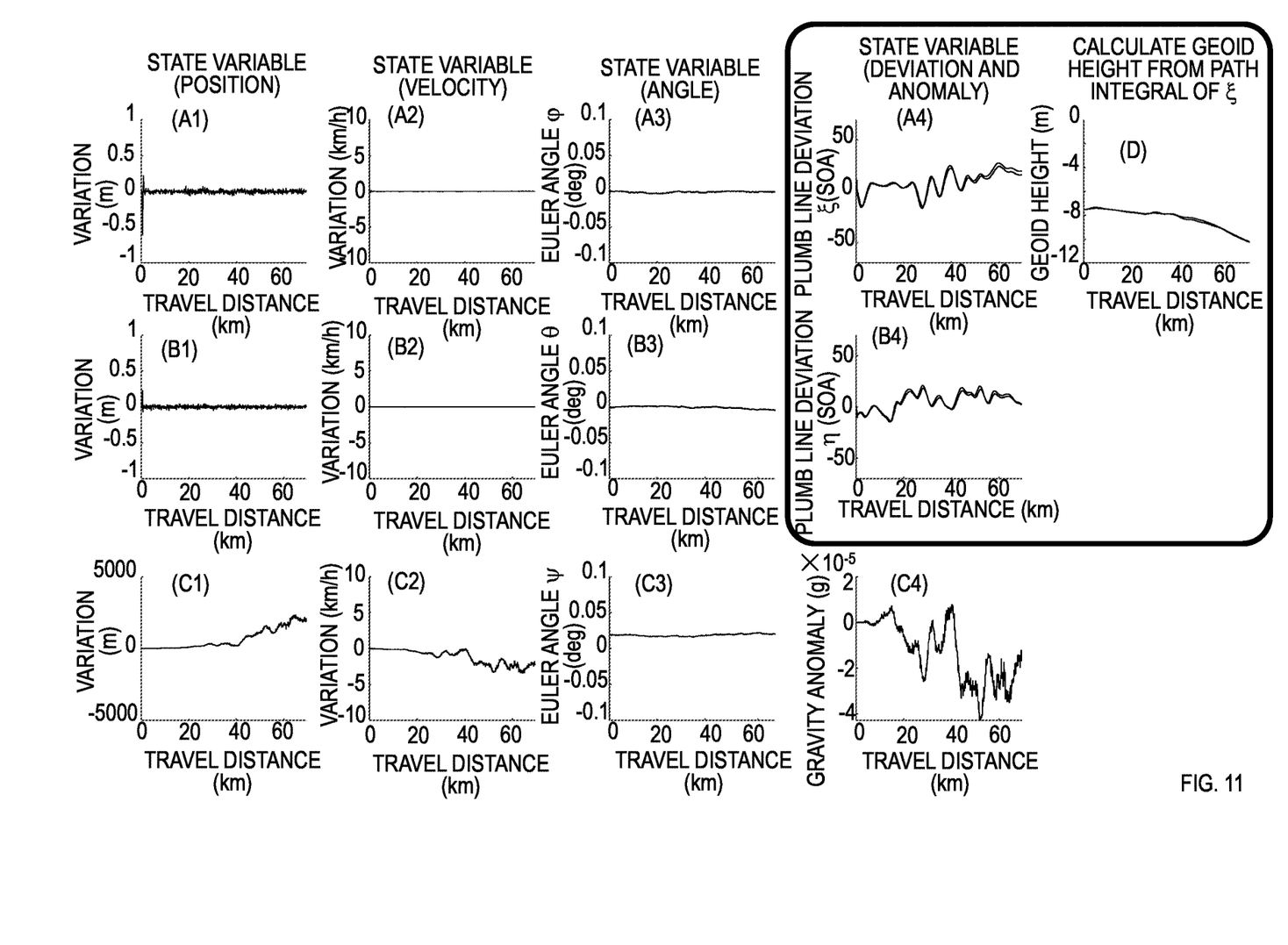
FIG. 11 is a diagram illustrating an example of estimating state variables including a plumb line deviation and a gravity anomaly by applying a Kalman filter in which the plumb line deviation and the gravity anomaly are included in the state variables to an average of data acquired by 100 vehicles with the same configuration as FIG. 8, and estimating geoid height based on the estimated plumb line deviation.
Figure 12:
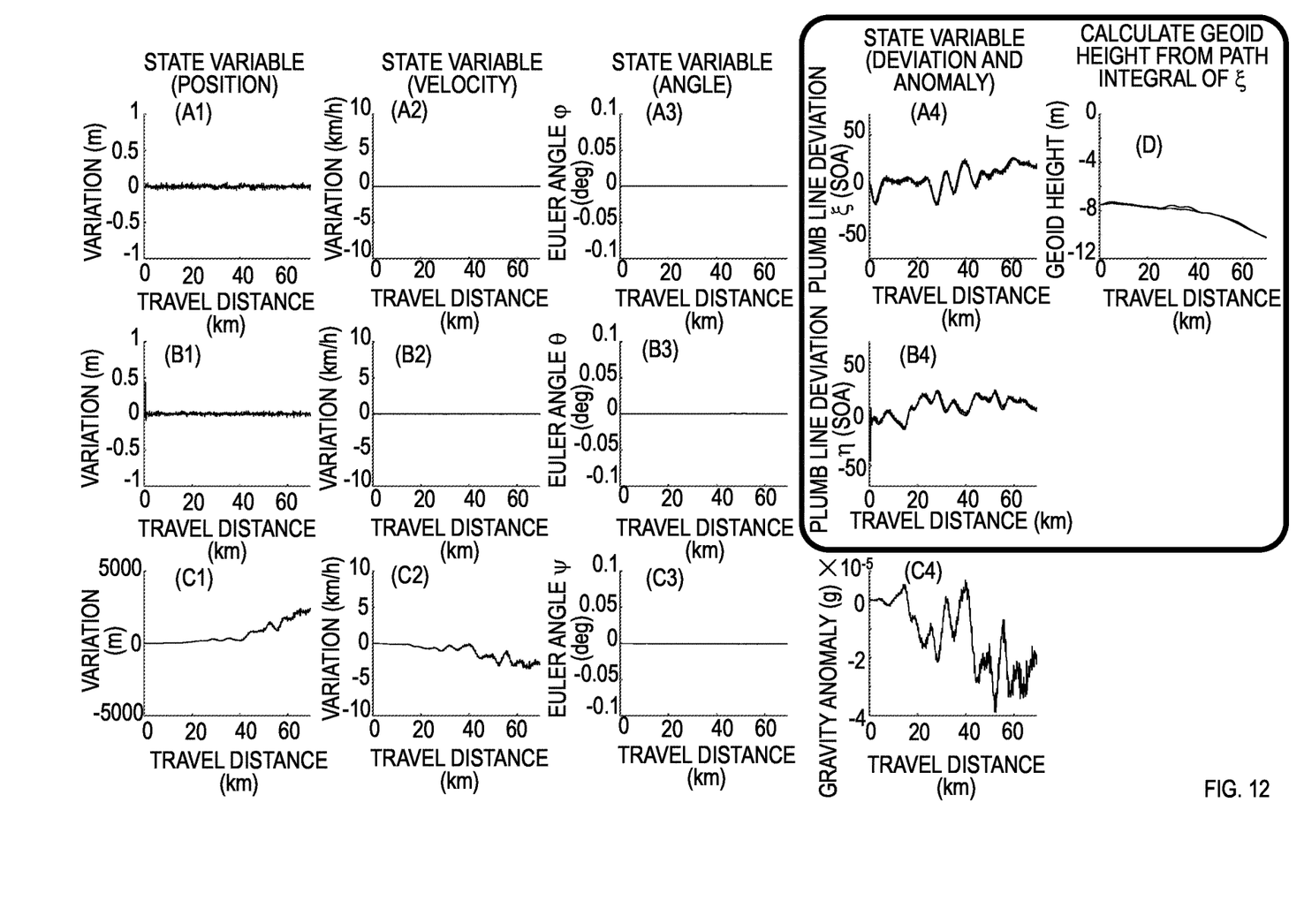
FIG. 12 is a diagram illustrating an example in which an inertial measurement part whose Allan deviation is improved over existing technology by an order of magnitude is installed onboard a vehicle, satellite positioning data is used as comparison data, the same configuration as the geoid measurement apparatus of the present invention is used, and geoid height is estimated with data obtained from a single run.

FIGS. 6 to 12 illustrate simulation results related to the measurement of geoid height. FIG. 6 illustrates a case where an inertial measurement part equipped with a ring laser gyro (RLG) having a level of precision comparable to existing technology is installed onboard a vehicle, in which position, velocity, and angle data are acquired but comparison data is not acquired. In the case of the method illustrated in FIG. 6, because comparison data is not acquired, a Kalman filter cannot be applied. Consequently, the plumb line deviation and the gravity anomaly are not considered, and moreover the state variables are not estimated by the Kalman filter. The position, velocity, and angle indicate data acquired by the inertial measurement part. FIG. 7 illustrates an example in which an inertial measurement part equipped with a ring laser gyro having a level of precision comparable to existing technology is installed onboard a vehicle, satellite positioning data is used as comparison data, the same configuration as the geoid measurement apparatus of the present invention is used, and state variables including a plumb line deviation and a gravity anomaly are estimated by applying a Kalman filter in which the plumb line deviation and the gravity anomaly are included in the state variables to data obtained from a single run. FIG. 8 illustrates an example of measuring geoid height based on the estimated plumb line deviation in the example illustrated in FIG. 7. FIG. 9 illustrates data obtained from 10 runs with the same configuration as FIG. 6. FIG. 10 illustrates an example of measuring geoid height with data obtained from 10 runs with the same configuration as FIG. 8. FIG. 11 illustrates an example of estimating state variables including a plumb line deviation and a gravity anomaly by applying a Kalman filter in which the plumb line deviation and the gravity anomaly are included in the state variables to an average of data acquired by 100 vehicles with the same configuration as FIG. 8, and estimating geoid height based on the estimated plumb line deviation. FIG. 12 illustrates an example in which an inertial measurement part whose Allan deviation is improved over existing technology by an order of magnitude is installed onboard a vehicle, satellite positioning data is used as comparison data, the same configuration as the geoid measurement apparatus of the present invention is used, and geoid height is estimated with data obtained from a single run. In all of the simulations, the vehicles are made to run for 80 minutes at a speed of 50 km/h in the north-south direction. Also, in the example of measuring the geoid height, the geoid height of a portion of the path is known. The conditions of the simulations in FIGS. 6 to 12 are summarized below.

FIG. 6: vehicles run for 80 minutes at 50 km/h, RLG inertial navigation device used, only inertially-derived data used.

FIG. 7: vehicles run for 80 minutes at 50 km/h, RLG inertial navigation device and satellite positioning used, satellite positioning performed every 10 seconds, Kalman filter applied to estimate state variables.

FIG. 8: vehicles run for 80 minutes at 50 km/h, RLG inertial navigation device and satellite positioning used, satellite positioning performed every 10 seconds, Kalman filter applied to estimate state variables, geoid height calculated.

FIG. 9: vehicles run for 80 minutes at 50 km/h, RLG inertial navigation device used, only inertially-derived data used, 10 runs of data used. FIG. 10: vehicles run for 80 minutes at 50 km/h, RLG inertial navigation device and satellite positioning used, satellite positioning performed every 10 seconds, Kalman filter applied to estimate state variables, geoid height calculated, 10 runs of data used.

FIG. 11: vehicles run for 80 minutes at 50 km/h, RLG inertial navigation device and satellite positioning used, satellite positioning performed every 10 seconds, Kalman filter applied to estimate state variables, geoid height calculated, data from 100 vehicles averaged.

FIG. 12: vehicles run for 80 minutes at 50 km/h, inertial calculation part with Allan deviation improved by an order of magnitude and satellite positioning used, satellite positioning performed every 10 seconds, Kalman filter applied to estimate state variables, geoid height calculated, measurement performed once.

In each of the graphs in FIGS. 6 to 12, the horizontal axis represents the travel distance (km). The vertical axes represent (A1) variation in position in the forward direction (m), (B1) variation in position in the width direction (m), (C1) variation in position in the vertical direction (m), (A2) variation in speed in the forward direction (km/h), (B2) variation in speed in the width direction (km/h), (C2) variation in speed in the vertical direction (km/h), (A3) to (C3) variation in the attitude angle (degrees), (A4) plumb line deviation $\xi$ in the north-south direction (seconds of arc (SOA)), (B4) plumb line deviation $\eta$ in the east-west direction (SOA), (C4) gravity anomaly (g), and (D) change in geoid height or the geoid height (m). Note that (A3) illustrates the Euler angle $\varphi$, (B3) illustrates the Euler angle $\theta$, and (C3) illustrates the Euler angle $\psi$. The lines labeled [1] in (A4) and (B4) of FIG. 6 illustrate the actual values set in the simulation (the plumb line deviations that match in the case where accurate simulation is achieved). FIGS. 7 to 12 also illustrate similar lines, but [1] is omitted where labeling is difficult. The lines labeled [2] in (A4) and (B4) of FIG. 7 illustrate the estimated plumb line deviation. The same is true of FIG. 8. In the simulations illustrated in FIGS. 6 and 9, the plumb line deviation is not estimated. The lines not labeled [1] in (A4) and (B4) of FIG. 10 are the estimated plumb line deviation. In FIGS. 11 and 12, the actual values and the estimated plumb line deviation are substantially aligned, and therefore the labels [1] and [2] are omitted. The line labeled [3] in (D) of FIG. 8 illustrates the actual geoid height set in the simulation. The line labeled [4] illustrates the calculated geoid height. In (D) of FIG. 10, the line not labeled [3] is the calculated geoid height. In FIGS. 11 and 12, the actual geoid height and the calculated geoid height are substantially aligned, and therefore the labels [3] and [4] are omitted. The geoid height can be calculated by taking the path integral of the estimated plumb line deviation. In the simulations, because the vehicles run north-south, the geoid height is calculated from the path integral of the north-south plumb line deviation 4.

In the simulation illustrated in FIG. 6, because the state variables are not estimated, the error in the inertially-derived data, the plumb line deviation, and the gravity anomaly cannot be estimated. Consequently, the plumb line deviation in the north-south direction, the plumb line deviation in the east-west direction, and the gravity anomaly are "0". In the simulation illustrated in FIG. 7, the state variables including the plumb line deviation and the gravity anomaly are estimated. Consequently, the error in the inertially-derived data, the plumb line deviation, and the gravity anomaly can be estimated. Also, the inertially-derived data is corrected using the estimated state variables. However, because the inertially-derived data is low-precision, as (A4) and (B4) of FIG. 7 demonstrate, the plumb line deviation in the north-south direction and the plumb line deviation in the east-west direction are different from the line labeled [1] that illustrates the actual values. FIG. 8 is an example of measuring geoid height based on the estimated plumb line deviation illustrated in FIG. 7. Because the inertially-derived data is low-precision, as illustrated in (D) of FIG. 8, the calculated geoid height is totally different from the actual geoid height. In the simulation illustrated in FIG. 9, 10 runs of data measured with the same configuration as FIG. 6 are illustrated. As (A1) to (A3), (B1) to (B3), and (C1) to (C3) of FIG. 9 demonstrate, even though the same path is measured with the same configuration, there are large inconsistencies in the measurement data. FIG. 10 illustrates the data obtained from 10 runs of a process similar to FIG. 8. As (A4), (B4), and (D) of FIG. 10 demonstrate, the plumb line deviation in the north-south direction, the plumb line deviation in the east-west direction, and the geoid height have extremely large inconsistencies. FIG. 11 uses the average of the data from 100 vehicles. Because the average of data measured from 100 repeated runs is used, the precision of the inertially-derived data is improved tenfold. As (A4), (B4), and (D) of FIG. 11 demonstrate, the calculated plumb line deviation in the north-south direction, plumb line deviation in the east-west direction, and geoid height substantially match the actual values. In other words, the above demonstrates that if the precision of the inertially-derived data is improved by an order of magnitude over the related art, a change in geoid height similar to the actual change in geoid height can be measured. In FIG. 12, the precision of the inertial measurement part has been improved by an order of magnitude, and therefore the data obtained from a single run yields a result similar to FIG. 11.

In the case of using a typical gyro commercially available at the time of the present application, the geoid measurement method, geoid measurement apparatus, geoid estimation device, and geoid calculation data collection device of the present invention can be implemented by reducing error through repeated measurement. Also, if measures such as increasing the diameter of a ring laser gyro are taken, the geoid measurement method and the like of the present invention can be implemented even without performing repeated measurement.

For example, if the geoid measurement apparatus of the present invention having an inertial measurement part with improved precision is installed onboard an automobile and driven between two benchmarks, the continuous geoid height can be measured easily. Furthermore, if GPS information is also used, the continuous elevation is also understood easily. Also, if the geoid measurement apparatus of the present invention having an inertial measurement part with improved precision is installed onboard a train and driven periodically, a change in geoid height can be measured periodically. Consequently, there is a possibility of being able to observe the movement of Earth's crust or the ground.

DESCRIPTION OF REFERENCE NUMERALS 10 geoid measurement apparatus
100 geoid calculation data collection device
110 inertial measurement part
120 inertial measurement data acquisition part
130 comparison data acquisition part
200 geoid estimation device
210 state variable estimation part
220 geoid calculation part
300 recording part

What is claimed is:

1. A geoid measurement method comprising:
an inertial measurement data acquiring step of acquiring data related to velocity, position, and attitude angle as inertially-derived data based on an output of an inertial measurement part having a three-axis gyro and a three-axis accelerometer attached to a moving body;
a comparison data acquiring step of acquiring data related to velocity as comparison data from a source other than the inertial measurement part;
a state variable estimating step of estimating state variables including a plumb line deviation by using the inertially-derived data and the comparison data to apply a Kalman filter in which the plumb line deviation is included in the state variables; and
a geoid calculating step of calculating a change in geoid height based on the estimated plumb line deviation at an estimated position that the estimating applied to.

2. The geoid measurement method according to claim 1, wherein
the data related to velocity, position, and attitude angle acquired in the inertial measurement data acquiring step is data that is corrected using the estimated state variables.

3. The geoid measurement method according to claim 2, wherein
in the geoid calculating step, a geoid height is calculated at each of the estimated positions based on information about a geoid height at a reference position acquired in advance.

4. The geoid measurement method according to claim 1, wherein
in the geoid calculating step, a geoid height is calculated at each of the estimated positions based on information about a geoid height at a reference position acquired in advance.

5. A geoid measurement apparatus comprising:
an inertial measurement data acquisition part, provided with an inertial measurement part having a three-axis gyro and a three-axis accelerometer to be attached to a moving body, and that acquires data related to velocity, position, and attitude angle as inertially-derived data;
a comparison data acquisition part that acquires data related to velocity as comparison data from a source other than the inertial measurement part;
a state variable estimation part that estimates state variables including a plumb line deviation by using the inertially-derived data and the comparison data to apply a Kalman filter in which the plumb line deviation is included in the state variables; and
a geoid calculation part that calculates a change in geoid height based on the estimated plumb line deviation at an estimated position that the estimating applied to.

6. The geoid measurement apparatus according to claim 5, wherein
the data related to velocity, position, and attitude angle acquired by the inertial measurement data acquisition part is data that is corrected using the estimated state variable.

7. The geoid measurement apparatus according to claim 6, further comprising:
a recording part that records information about a geoid height with respect to a predetermined reference position, wherein
the geoid calculation part calculates a geoid height at each of the estimated positions based on the information about the geoid height.

8. The geoid measurement apparatus according to claim 5, further comprising:
a recording part that records information about a geoid height with respect to a predetermined reference position, wherein
the geoid calculation part calculates a geoid height at each of the estimated positions based on the information about the geoid height.

9. The geoid measurement apparatus according to claim 5, wherein the comparison data acquisition part captures radio waves transmitted from an artificial satellite.

10. The geoid measurement apparatus according to claim 5, wherein the comparison data acquisition part includes a speedometer.

11. The geoid measurement apparatus according to claim 5, wherein the gyro is a gyro using atomic waves or ions.

12. A geoid estimation device comprising:
a recording part that records inertially-derived data and comparison data in association with each other, the inertially-derived data being data related to velocity, position, and attitude angle acquired based on an output of an inertial measurement part having a three-axis gyro and a three-axis accelerometer attached to a moving body, and the comparison data being data related to velocity acquired from a source other than the inertial measurement part;

a state variable estimation part that estimates state variables including a plumb line deviation by using the inertially-derived data and the comparison data to apply a Kalman filter in which the plumb line deviation is included in the state variables; and a geoid calculation part that calculates a change in geoid height based on the estimated plumb line deviation at an estimated position that the estimating applied to.

13. The geoid estimation device according to claim 12, wherein the recording part also records information about a geoid height with respect to a predetermined reference position, and the geoid calculation part calculates a geoid height at each of the estimated positions based on the information about the geoid height.

* * * * *